US010338695B1

(12) United States Patent
Hsiao

(10) Patent No.: US 10,338,695 B1
(45) Date of Patent: Jul. 2, 2019

(54) AUGMENTED REALITY EDUGAMING INTERACTION METHOD

(71) Applicant: MING CHUAN UNIVERSITY, Taipei (TW)

(72) Inventor: Kuei-Fang Hsiao, Taoyuan (TW)

(73) Assignee: MING CHUAN UNIVERSITY, Taipei (TW)

( * ) Notice: Subject to any disclaimer, the term of this patent is extended or adjusted under 35 U.S.C. 154(b) by 0 days.

(21) Appl. No.: 16/378,660

(22) Filed: Apr. 9, 2019

Related U.S. Application Data

(63) Continuation-in-part of application No. 15/687,725, filed on Aug. 28, 2017.

(30) Foreign Application Priority Data

Jul. 26, 2017 (TW) ............................ 106125046 A
Mar. 27, 2019 (TW) ............................ 108110744 A

(51) Int. Cl.
*G06F 3/033* (2013.01)

(52) U.S. Cl.
CPC ................................ *G06F 3/033* (2013.01)

(58) Field of Classification Search
CPC ........ H04N 13/04; H04N 13/00; H04N 13/02; H04N 9/75; G02B 27/01; G09G 3/20; G09G 5/30; G09G 5/02; G09G 5/08; G06F 3/033; A63F 13/213; A63F 13/22; A63F 13/24; A63F 13/843; A63F 13/428; A63F 13/06; A63F 13/21; G06T 7/11; G06T 7/20; G06T 7/70; G01B 11/14
See application file for complete search history.

(56) References Cited

U.S. PATENT DOCUMENTS

| 9,724,597 | B2* | 8/2017 | Mikhailov | A63F 13/04 |
| 9,921,052 | B2* | 3/2018 | Ikenoue | A63F 13/06 |
| 2010/0303297 | A1* | 12/2010 | Mikhailov | H04N 9/75 382/103 |
| 2011/0034244 | A1* | 2/2011 | Marks | A63F 13/02 463/30 |
| 2012/0249422 | A1* | 10/2012 | Tse | G06F 3/017 345/158 |
| 2015/0209664 | A1* | 7/2015 | Haseltine | A63F 13/00 463/31 |

* cited by examiner

*Primary Examiner* — Pegeman Karimi
(74) *Attorney, Agent, or Firm* — Rosenberg, Klein & Lee

(57) ABSTRACT

An augmented reality edugaming interaction method includes the steps of: creating at least one database in a processing device and at least one target value in the database and linking the target value with different data values; defining plural interactive object images and at least one controllable object image by the processing device; setting plural interaction statuses for the interactive object image and at least one interactive instruction for the controllable object image, and selecting one of the target values, so that its data value depends on the interactive object image; setting at least one color recognition value for the processing device; defining the image with the range of the color block as a characteristic area, if the image captured by the image capturing device has a color block corresponding to the color recognition value, and letting the controllable object image depend on and be controlled in the characteristic area.

10 Claims, 6 Drawing Sheets

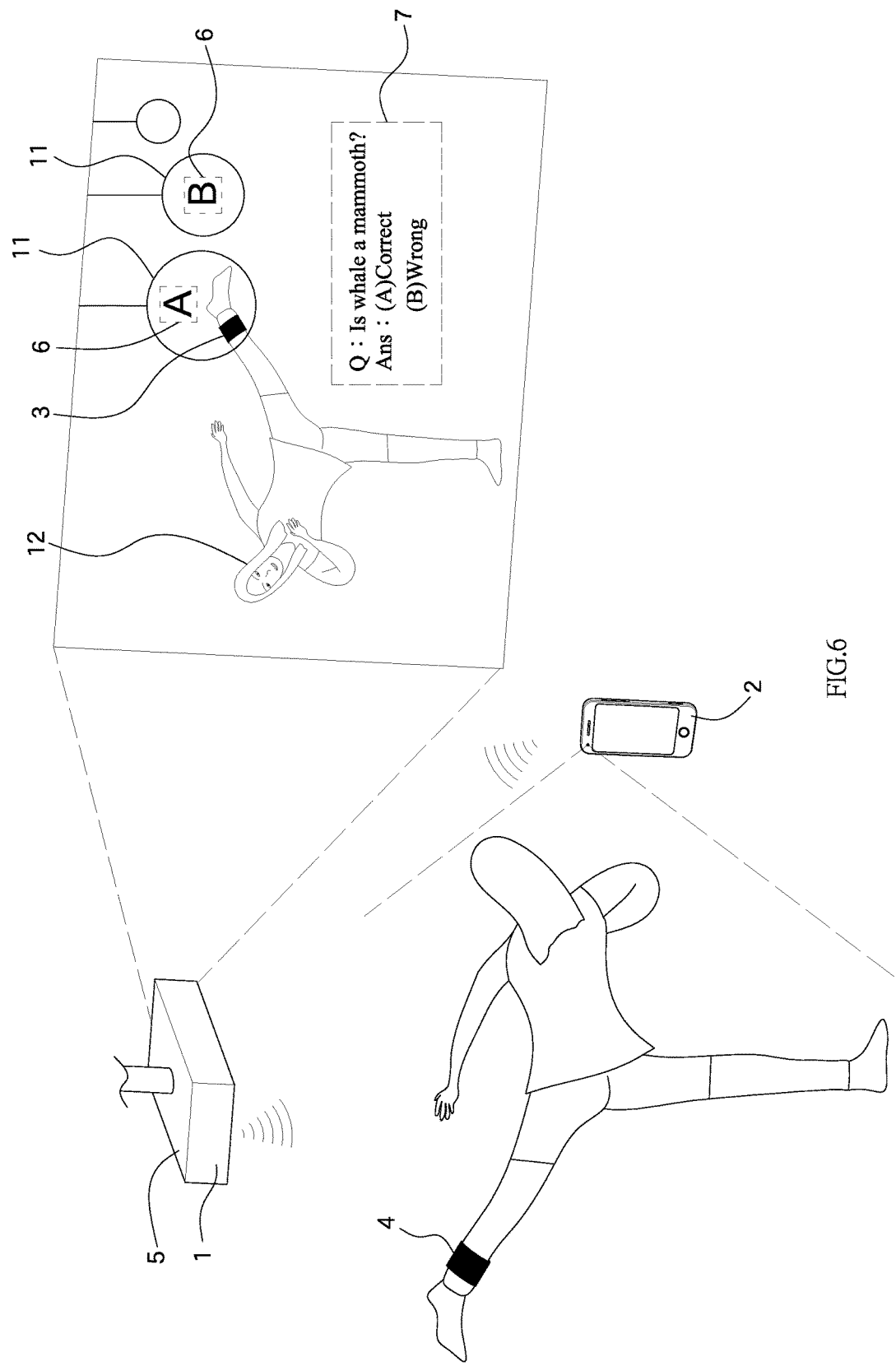

AUGMENTED REALITY EDUGAMING INTERACTION METHOD

REFERENCE TO RELATED APPLICATIONS

This Application is a Continuation-in-Part of U.S. patent application Ser. No. 15/687,725, filed 28 Aug. 2017, currently pending, which claims priority to Taiwanese Patent Application No. 106125046, filed 26 Jul. 2017. This Application also claims priority to Taiwanese Patent Application No. 108110744, filed 27 Mar. 2019.

FIELD OF THE INVENTION

The present invention relates to an augmented reality edugaming interaction method, and more particularly to the method of using a combination of data values and interactive object images to control a controllable object image to interact with an interactive object image in augmented reality and allow users to select an option.

BACKGROUND OF THE INVENTION

Augmented Reality (AR) uses a physical position to calculate the position and angle of a camera image, and the technologies presented through images have an extremely wide scope of applicability, and such technologies may be applied extensively in various technical areas such as satellites, mobile devices, surgeries, industries, entertainments, etc.

Compared with traditional teaching, a combination of Augmented Reality (AR), Internet of Things (IoT) and related equipment such as a projector, a smartphone, and a personal computer is integrated in classrooms to present vivid augmented reality images and allow users to interact with each other, and such teaching method can promote students' learning motivation and performance.

For interactions with the augmented reality, an expensive device such as Microsoft® Kinect or recently launched Azure Kinect DK is generally used to identify a user's skeleton, or a computer with high computing power is generally used to identify a human image and trace its position and movement, so that the user can interact with the movable object defined by the augmented reality. Areas without sufficient information infrastructure, such as developing countries, have limited funds to build augmented reality related equipment and cannot afford expensive augmented reality equipment. As a result, the students' learning effect in these areas or countries cannot be improved, and it leads to related social problems including uneven allocation of teaching resources and large gap between urban and rural areas.

In view of the aforementioned drawbacks, the inventor of the present invention based on years of experience in the field of augmented reality interactions to conduct extensive research and experiment, and finally provided a feasible solution as disclosed in this invention to overcome the aforementioned drawbacks.

SUMMARY OF THE INVENTION

Therefore, it is a primary objective of the present invention to overcome the aforementioned drawbacks of the prior art by providing an augmented reality edugaming interaction method, and the method comprises the steps of: creating at least one database in a processing device and at least one target value in the database and linking the target value to a plurality of different data values separately; defining a plurality of interactive object images and at least one controllable object image in the processing device; setting a plurality of interaction statuses for the interactive object image, at least one interactive instruction for the controllable object image setting; and at least one color recognition value for the processing device; selecting one of the target values by the processing device, so that the data value corresponding to the target value depends on the corresponding interactive object image; capturing an image by an image capturing device; using the processing device to analyze the image captured by the image capturing device, and defining the image with the range of the color block as a characteristic area if the image captured by the image capturing device has a color block corresponding to the color recognition value, and letting the controllable object image depend on and be controlled in the characteristic area; projecting an image corresponding to the interactive object image, the controllable object image, the characteristic area, the selected target value and its corresponding data value by a projection device, wherein a visual dependence exists between the interactive object image and the image with its dependent data value; and defining an interactive instruction by the processing device when at least one characteristic area and at least one interactive object image are superimposed, so that the interactive object image depends on and is controlled by the interactive instruction to switch the interactive status.

In the augmented reality edugaming interaction method, the target value is a question, and the data value is a corresponding answer option.

In the augmented reality edugaming interaction method, the processing device is a computer, a microcomputer, a tablet PC, a smart device, or an embedded processor.

The augmented reality edugaming interaction method further comprises the step of: setting at least one label object, wherein the label object has at least a color corresponding to the color recognition value, and the image capturing device captures an image of the label object, so as to let the processing device define the characteristic area.

In the augmented reality edugaming interaction method, the label object is a wearable object.

The augmented reality edugaming interaction method further comprises the steps of: using the processing device to adjust the brightness of the image according to its ambient brightness; and analyzing whether or not the image with the adjusted brightness has a color block of the color recognition value.

In the augmented reality edugaming interaction method, the controllable object image is an image of a user.

In the augmented reality edugaming interaction method, the image capturing device is a photography device or a smartphone.

In the augmented reality edugaming interaction method, the projection device projects an augmented reality image.

In the augmented reality edugaming interaction method, the processing device, the image capturing device and the projection device carry out a signal connection by the Internet, a local area network, or a Bluetooth connection.

In summation of the description above, the present invention has the following advantages and effects:

1. The present invention creates a database having a target value and its data value by the processing device. If the target value is selected, its corresponding data value and the interactive object image will be projected synchronously and defined by the color recognition value, so as to define the image captured by the image capturing device and having the color block of the color recognition value as the characteristic area, and the superimposition of the characteristic area with the interactive object image is used to select the data value in order to execute the interactive instruction. This invention analyzes, recognizes, or traces a user's movement without requiring expensive equipment or complicated computation, and the invention is capable of identifying a user's position and movement, and the user can interact with the controllable object image to answer a question, and thus the invention can achieve the effect of learning with fun and improve the users' learning motivation and efficiency. In addition, the invention will not delay the interactions due to the complicated computation. When there are a multiple of users, label objects with different color recognition values may be worn, so that group users and the interactive object image can interact with each other. The present invention is very important to group interaction and competition to group teaching, and the invention definitely has the features of simple equipment, low cost, powerful function, and fast computation.

BRIEF DESCRIPTION OF THE DRAWINGS

FIG. 6 is a schematic view of the using status of the present invention as depicted in FIG. 5, wherein a user selects an interactive object image with a corresponding data value and drives the interactive object image to produce a change of the interactive status

DESCRIPTION OF THE PREFERRED EMBODIMENTS

The technical contents of the present invention will become apparent with the detailed description of preferred embodiments accompanied with the illustration of related drawings as follows. It is intended that the embodiments and figures disclosed herein are to be considered illustrative rather than restrictive.

Figure 1:
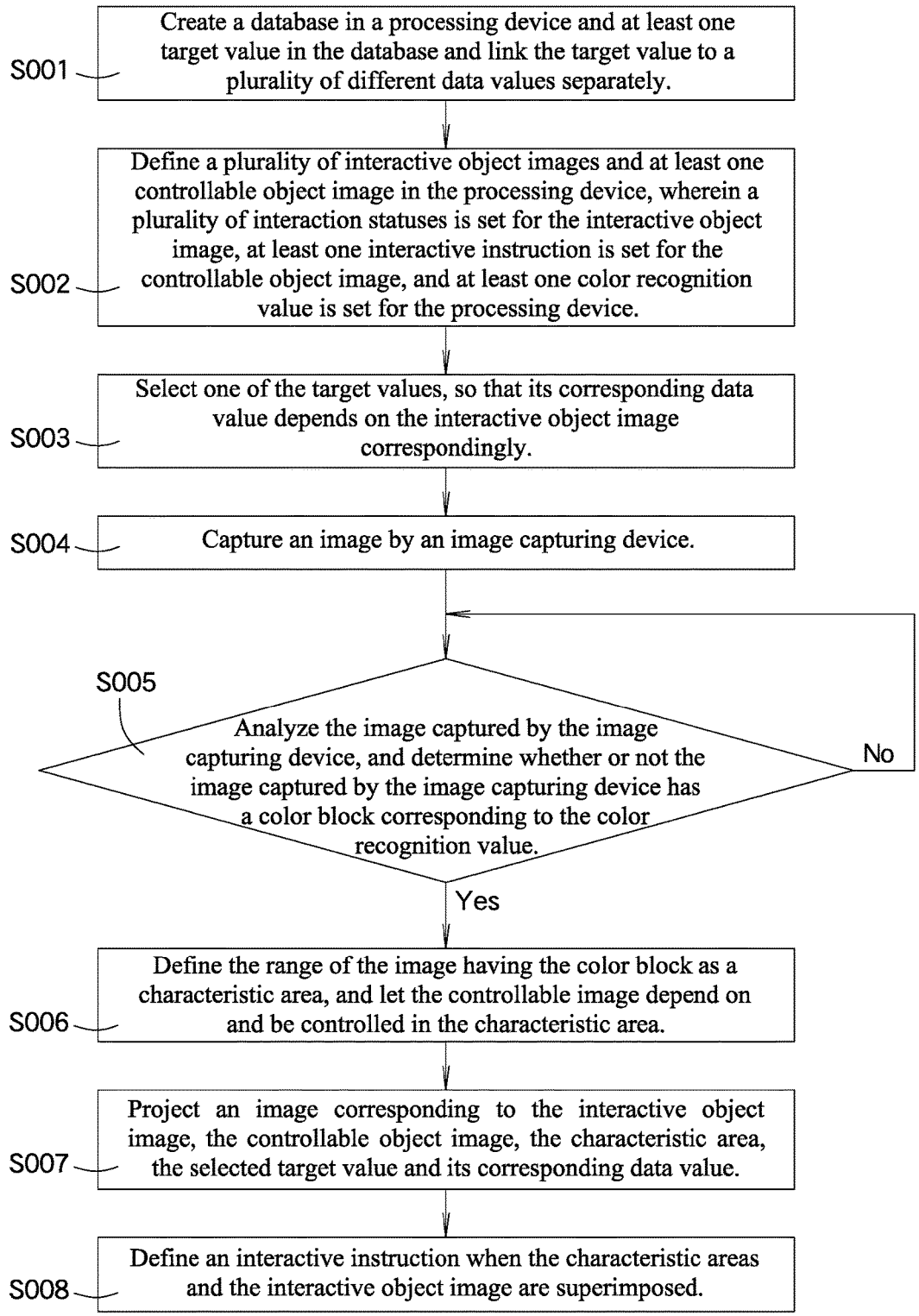
FIG. 1 is a flowchart of the present invention.
Figure 2:
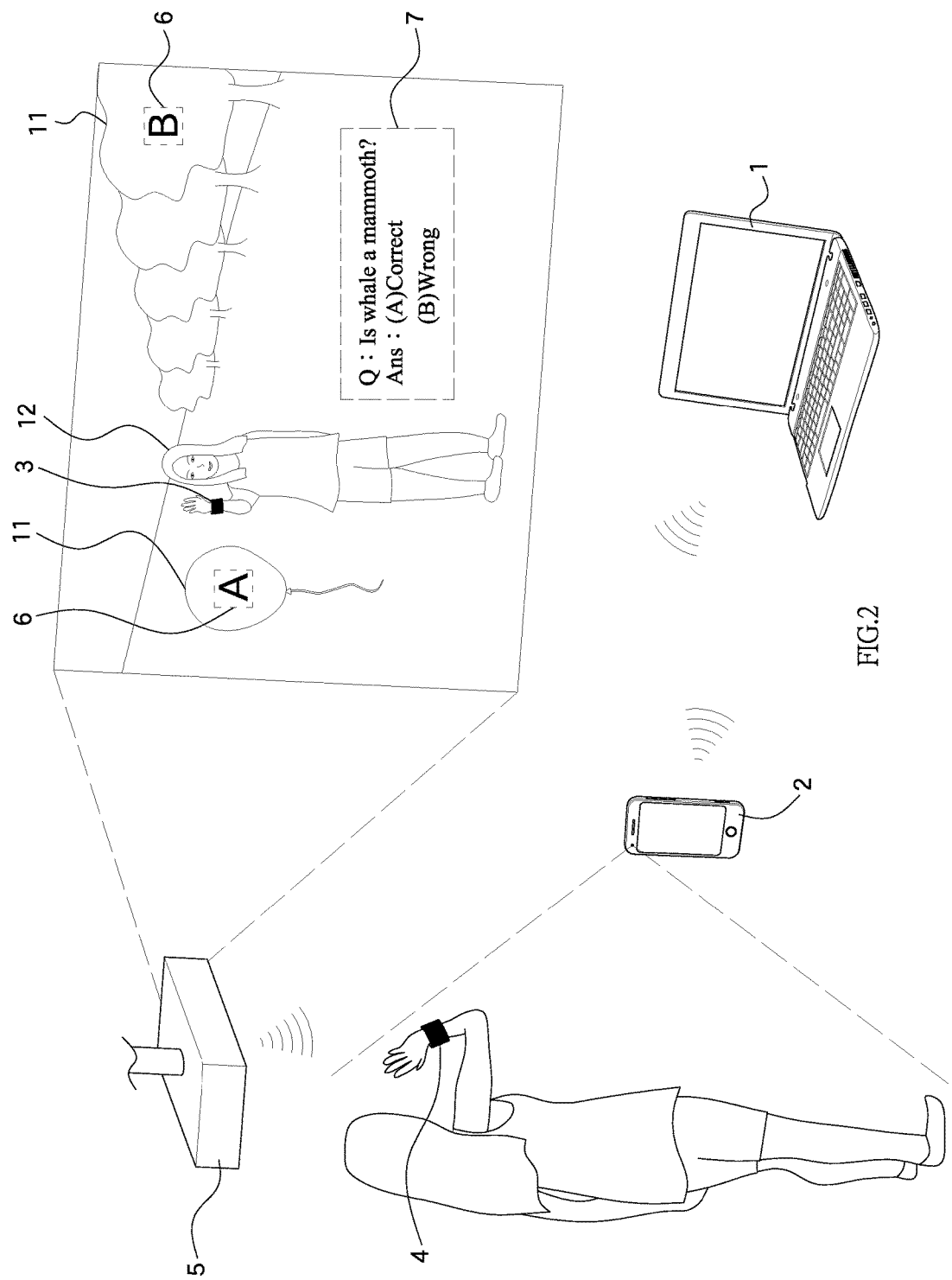
FIG. 2 is a schematic view of a using status of a processing device which is a notebook computer in accordance with the present invention.
Figure 3:
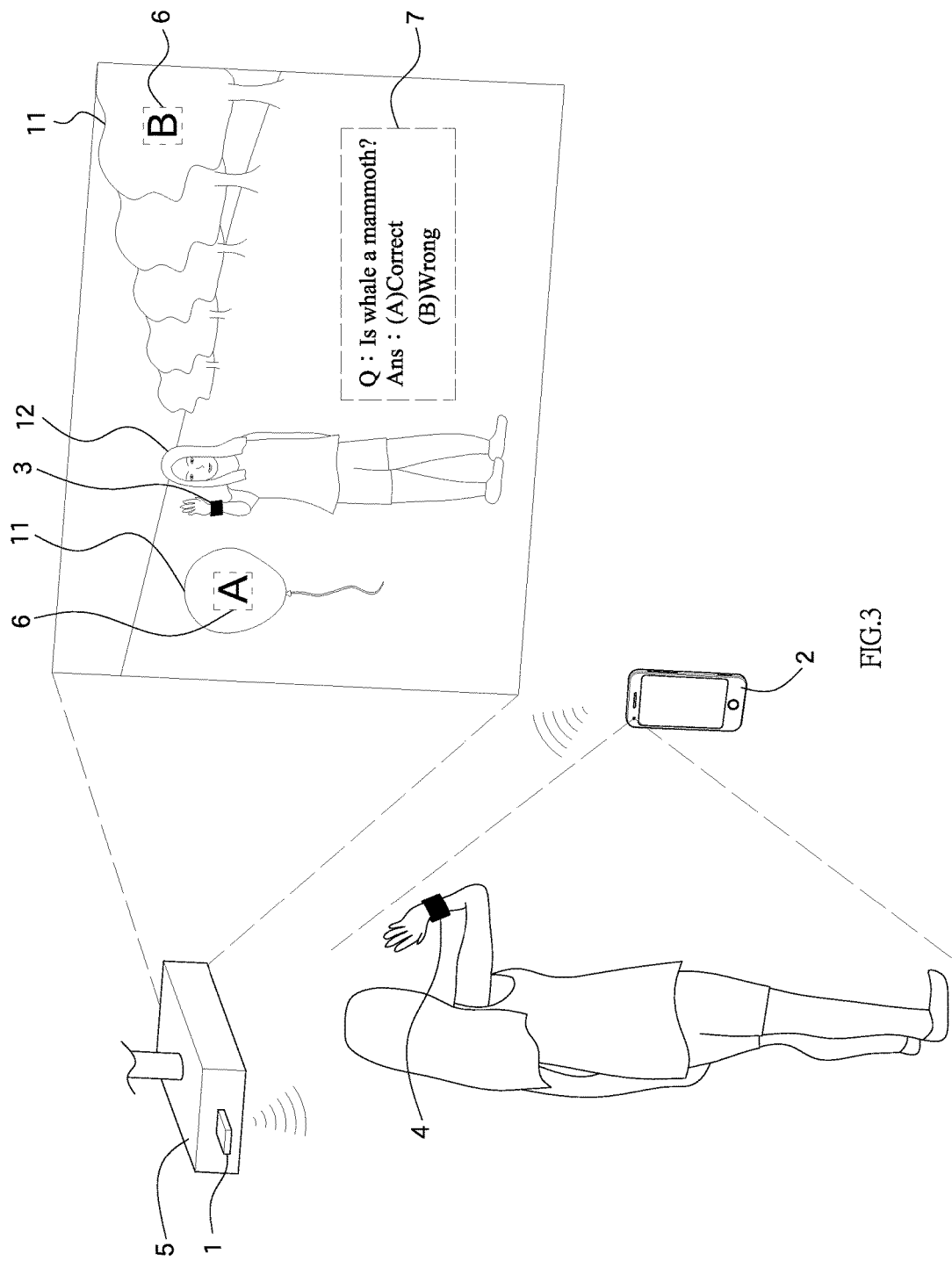
FIG. 3 is a schematic view of a using status of a processing device which is a microcomputer in accordance with the present invention.

With reference to FIGS. 1 and 2 for an augmented reality edugaming interaction method of the present invention, the augmented reality edugaming interaction method comprises the following steps:

S001: Set a processing device 1. In an embodiment, the processing device 1 is a computer device such as a computer, a microcomputer, a tablet PC, a smart device or an embedded processor for executing augmented reality computations, and an operating system such as WINDOWS, ANDROID or iOS is provided for the operation. In a specific embodiment, the processing device 1 may be an embedded processing device such as a USB stick preloaded with programs which is installed to a computer for the operation. In another embodiment as shown in FIG. 3, the processing device 1 is a microcomputer such as Asus VivoStick, Intel compute Stick, NexBox ACECP or Asus Chromebit, but these are examples provided for the purpose of illustrating the present invention only, but not intended for limiting the scope of the invention.

In the processing device 1, at least one database is created, and at least one target value is created in the database, and the target value is linked to a plurality of different data values. In this embodiment, the target value is a textual question used for teaching, and the area of teaching includes but not limited to the subjects such as English, mathematics, Chinese, history, science and chemistry, biology, or any other user's self-defined questions, and the data value is an answer option corresponding to the question, and the answer option can be categorized into a correct option or a wrong option according to the requirement of the question, but this example is provided for the purpose of illustrating the prevent invention only, but not intended for limiting the scope of the invention.

S002: Define a plurality of interactive object images 11 and at least one controllable object image 12 in the processing device 1. A plurality of interaction statuses is set up for the interactive object image 11. Specifically, the interactive status refers to a mode of the interactive object image 11. For example, the controllable object image 12 is an object image corresponding to a user's movement, and the interactive object image 11 is an interactive instruction executed by the controllable object image 12 to control the interactive status. In a specific embodiment, the controllable object image 12 is defined as an image of a user or a fictional character, and the interactive object image 11 is defined by users according to the purpose of use. For example, in a teaching environment, the interactive object image 11 may be set to be a teaching image such as an animal and plant image, a balloon, or an object image used for the interaction with the users. At least one interactive instruction is set for the controllable object image 12, and at least one color recognition value is set for the processing device 1.

S003: Select one of the target values by using the processing device 1 by an instructor, and the target value can be selected by a direct or remote control processing device 1, or by the processing device 1 according to the sequence of the target values or a random selection. After a specific target value is selected, the data value corresponding to the target value depends on the interactive object image 11 correspondingly.

S004: Set up an image capturing device 2 to capture an image. In an embodiment, the image capturing device 2 is a photography device or a smartphone, but these are provided for the purpose of illustrating the present invention only, but not intended for limiting the scope of the invention. In the Step S002 as described above, when the controllable object image 12 is an image of the user, the controllable object image 12 can be generated by the image captured by image capturing device 2.

Figure 4:
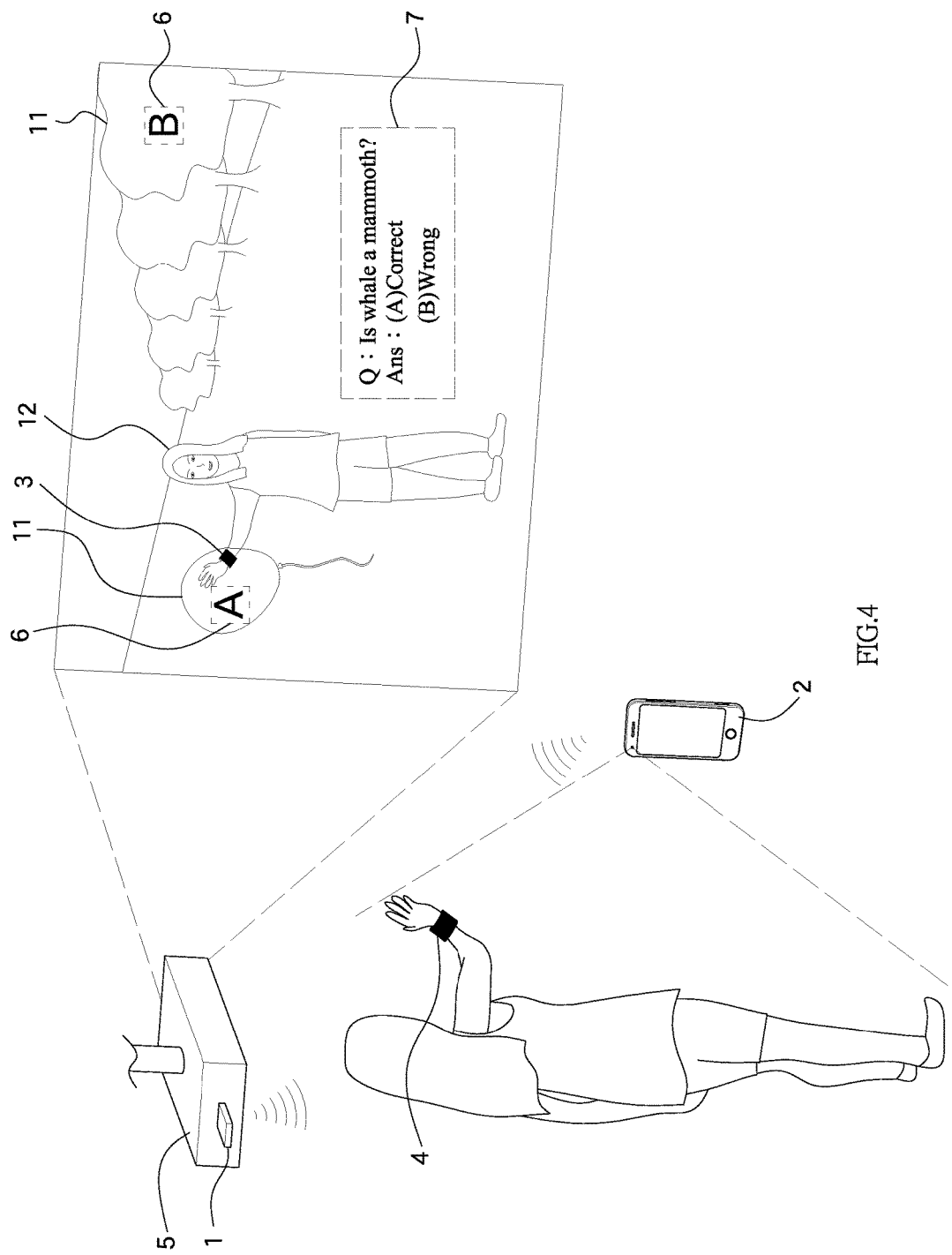
FIG. 4 is a schematic view of the using status of the present invention as depicted in FIG. 3, wherein a user selects an interactive object image with a corresponding data value and drives the interactive object image to produce a change of the interactive status.

S005: Analyze the image captured by the image capturing device 2 by using the processing device 1 and determine whether or not the image captured by the image capturing device 2 has a color block corresponding to the color recognition value as shown in FIGS. 3 and 4. If the captured image does not have the color block corresponding to the color recognition value, images will be captured and analyzed continuously.

Figure 5:
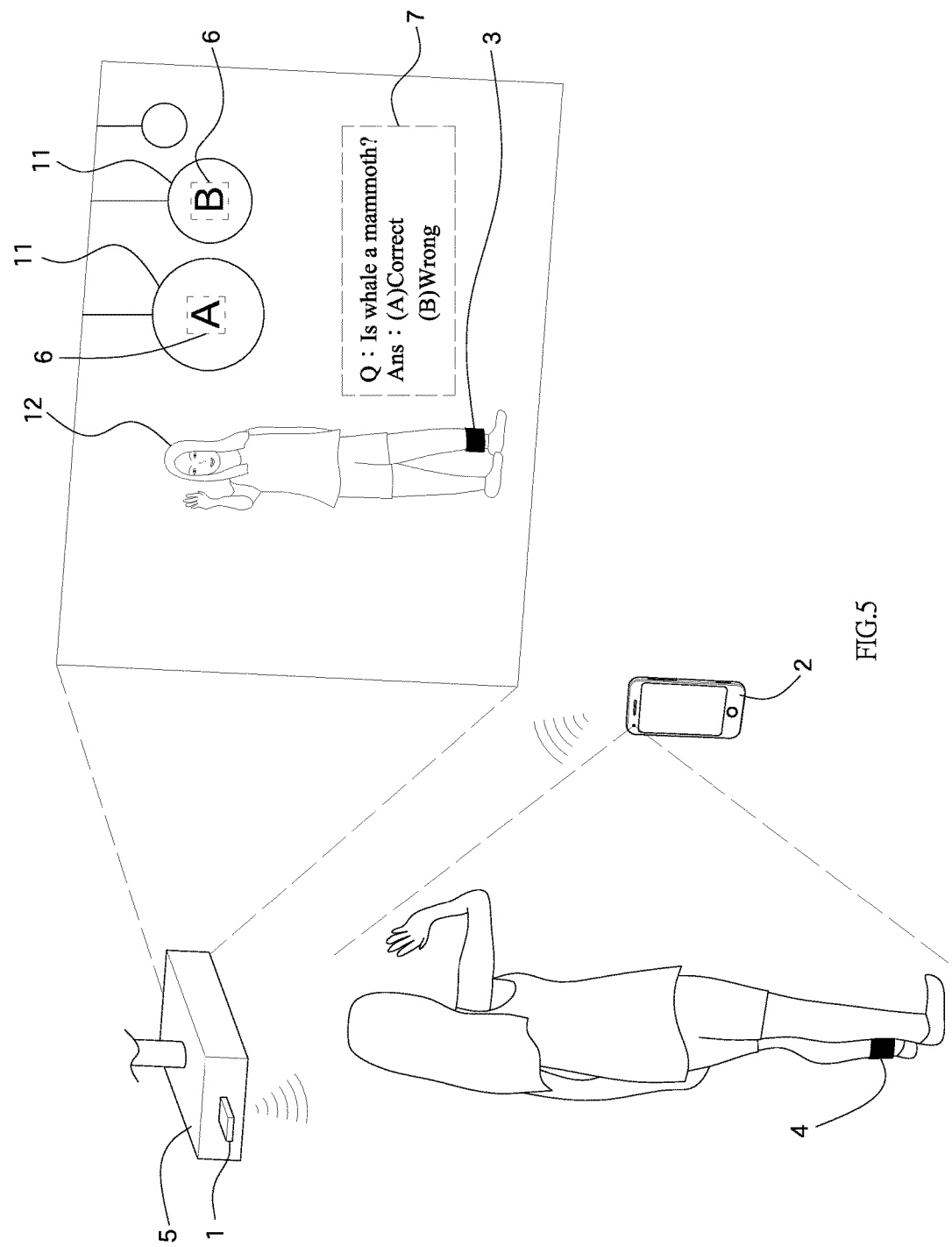
FIG. 5 is a schematic view of another using status of the present invention.

S006: Define the range of the image having the color block as a characteristic area 3, and let the controllable object image 12 depend on and be controlled in the characteristic area 3, if the image captured by the image capturing device 2 has a color block corresponding to the color recognition value, as shown in FIGS. 3 and 4. In a specific embodiment, the invention further comprises at least one label object 4 to facilitate capturing the characteristic area 3, wherein the label object 4 has at least one color corresponding to the color recognition value, and the image capturing device 2 captures the corresponding image of the label object 4 to let the processing device 1 define the characteristic area 3. Preferably, the label object 4 is a wearable object such as a hat, a piece of clothing, a bracelet, a foot ring, or any other accessory to facilitate users to wear as shown in FIG. 3. In this embodiment, the user wears the label object 4 at her wrist. In FIG. 5, the user wears the label object 4 at her ankle. These examples are provided for the purpose of illustrating the present invention only, but not intended for limiting the scope of the invention.

It is noteworthy that the present invention may be provided for the use by a multiple of users, and the processing device 1 has a plurality of color recognition values, and thus different label objects 4 may be of the same color or different colors to facilitate the classification and grouping.

However, color may be affected by the brightness of an ambient light source easily, so that when the processing device 1 receives the image captured by the image capturing device 2, the brightness of the image is adjusted according to the ambient brightness first, before the processing device 1 analyzes whether or not the image has a color block corresponding to the color recognition value.

S007: Project an image corresponding to the interactive object image 11, the controllable object image 12, the characteristic area 3, the selected target value and its corresponding data value by a projection device. In an embodiment, the projected image is a planar or augmented reality image; and a visual dependence exists between the interactive object image 11 and the image with its dependent data value. Therefore, the image 6 with the corresponding data value can be superimposed on the interactive object image 11, or disposed at the periphery of the interactive object image 11 in the embodiments as shown in FIGS. 3 and 5 respectively. The image 6 of the data value is superimposed on the interactive object image 11 to facilitate the user to determine and select the interactive object image 11, and the image 7 of the target value is projected to a position where the interactive object image 11, the controllable object image 12, the characteristic area 3, and the image 6 of the data value will not be not interfered.

Wherein, the processing device 1, the image capturing device 2 and the projection device 5 are connected by a cable or wireless connection. In an embodiment, the projection device 5 and the image capturing device 2 connected to the processing device 1 via the HDMI connection, and the wireless connection as shown in FIG. 2 may carry out a signal link by a near field communication such as the Internet, local area network or Bluetooth. If the processing device 1 is a microcomputer, then the processing device 1 can be connected to the projection device 5 directly through an interface such as a USB interface as shown in FIGS. 3 to 6, and the projection device 5 can be connected to the image capturing device 2 via the aforementioned cable or wireless connection. These examples are provided for the purpose of illustrating the present invention only, but not intended for limiting the scope of the invention.

S008: Define the interactive instruction by the processing device 1 when at least one of the characteristic areas 3 and at least one of the interactive object images 11 are superimposed with each other, wherein the interactive object image 11 depends on and is controlled by the interactive instruction to switch the interactive status as shown in FIGS. 4 and 6. In other words, when a user pre-selects the data value according to the description of the target value, the user can overlap the characteristic area 3 with one of the interactive object images 11, indicating that the corresponding data value is selected, so as to generate an interactive instruction, and allow at least one of the interactive object images 11 to change its interactive status, so as to achieve the effect of interaction, wherein the interactive status may be a specific expression form of the interactive object image 11 such as a change of position, movement, appearance, or color. In addition, the interactive status may be classified as a correct option or a wrong option according to the aforementioned data value, and the interactive status has a different expression to cope with its classification. These examples are provided for the purpose of illustrating the present invention only, but not intended for limiting the scope of the invention.

While the present invention has been described by means of specific embodiments, numerous modifications and variations could be made thereto by those skilled in the art without departing from the scope and spirit of the present invention set forth in the claims.

What is claimed is:

1. An augmented reality edugaming interaction method, comprising the steps of:

creating at least one database in a processing device and at least one target value in the database and linking the target value to a plurality of different data values separately;

defining a plurality of interactive object images and at least one controllable object image in the processing device;

setting a plurality of interaction statuses for the interactive object image, at least one interactive instruction for the controllable object image, and at least one color recognition value for the processing device;

selecting one of the target values by the processing device, so that the data value corresponding to the target value depends on the corresponding interactive object image;

capturing an image by an image capturing device;

analyzing the image captured by the image capturing device, and defining the image with the range of the color block as a characteristic area the processing device, if the image captured by the image capturing device has a color block corresponding to the color recognition value, and letting the controllable object image depend on and be controlled in the characteristic area;

projecting an image corresponding to the interactive object image, the controllable object image, the characteristic area, the selected target value and its corresponding data value by a projection device, wherein a visual dependence exists between the interactive object image and the image with its dependent data value; and defining an interactive instruction by the processing device when at least one characteristic area and at least one interactive object image are superimposed, so that the interactive object image depends on and is controlled by the interactive instruction to switch the interactive status.

2. The augmented reality edugaming interaction method according to claim 1, wherein the target value is a question, and the data value a corresponding answer option.

3. The augmented reality edugaming interaction method according to claim 1, wherein the processing device is a computer, a microcomputer, a tablet PC, a smart device, or an embedded processor.

4. The augmented reality edugaming interaction method according to claim 1, further comprising the step of:
   setting at least one label object, wherein the label object has at least a color corresponding to the color recognition value, and the image capturing device captures an image of the label object, so as to let the processing device define the characteristic area.

5. The augmented reality edugaming interaction method according to claim 4, wherein the label object is a wearable object.

6. The augmented reality edugaming interaction method according to claim 1, further comprising the steps of:
   using the processing device to adjust the brightness of the image according to its ambient brightness; and
   analyzing whether or not the image with the adjusted brightness has a color block of the color recognition value.

7. The augmented reality edugaming interaction method according to claim 1, wherein the controllable object image is an image of a user.

8. The augmented reality edugaming interaction method according to claim 1, wherein the image capturing device is a photography device or a smartphone.

9. The augmented reality edugaming interaction method according to claim 1, wherein the projection device projects an augmented reality image.

10. The augmented reality edugaming interaction method according to claim 1, wherein the processing device, the image capturing device and the projection device carry out a signal connection by the Internet, a local area network or a Bluetooth connection.

* * * * *